US007298407B2

(12) United States Patent
Moberg et al.

(10) Patent No.: US 7,298,407 B2
(45) Date of Patent: Nov. 20, 2007

(54) METHOD FOR REDUCING SHUTTER LATENCY WHILE MAINTAINING LOW DARK CURRENT IN AN IMAGER AND MINIMIZING ENERGY CONSUMPTION

(75) Inventors: Gregory O. Moberg, Rochester, NY (US); John P. Shepherd, Rochester, NY (US); Raymond J. Bouvy, Rochester, NY (US); John P. McCarten, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 858 days.

(21) Appl. No.: 10/268,449

(22) Filed: Oct. 10, 2002

(65) Prior Publication Data
US 2003/0133031 A1 Jul. 17, 2003

Related U.S. Application Data

(60) Provisional application No. 60/347,551, filed on Jan. 11, 2002.

(51) Int. Cl.
*H04N 9/64* (2006.01)
*H04N 5/335* (2006.01)
*H04N 3/14* (2006.01)

(52) U.S. Cl. ........................ 348/312; 348/243
(58) Field of Classification Search ................ 348/241, 348/243, 311, 312, 362, 364, 367
See application file for complete search history.

(56) References Cited

U.S. PATENT DOCUMENTS 4,232,331 A * 11/1980 Motoyama et al. ......... 348/243

| 5,115,458 A | 5/1992 | Burkey et al. ................. 377/58 |
| 5,693,948 A * | 12/1997 | Sayed et al. ........... 250/370.09 |
| 5,867,212 A * | 2/1999 | Toma et al. ................. 348/311 |
| 5,880,780 A | 3/1999 | Sekiguchi .................... 348/241 |
| 6,800,870 B2 * | 10/2004 | Sayag ......................... 250/584 |
| 2002/0093580 A1 | 7/2002 | Kijima et al. ............... 348/296 |

FOREIGN PATENT DOCUMENTS

JP 2000-032346 1/2000

OTHER PUBLICATIONS

Richard D. Nelson, Accumulation-mode Charge-coupled Device, Nov. 15, 1974, American Institute of Physics, Applied Physics Letters, vol. 25, No. 10, pp. 568-570.*
Albert J.P. Theuwissen, "Solid-State Imaging With Charge-Coupled Devices," *10.1.5. Pinned-Phase CCDs*, Kluwer Academic Publishers, 1995, Chapter 10, pp. 285-290.

* cited by examiner

*Primary Examiner*—Lin Ye
*Assistant Examiner*—Justin P Misleh
(74) *Attorney, Agent, or Firm*—Peyton C. Watkins

(57) ABSTRACT

A method for reducing shutter latency while maintaining low dark current in the imager and minimizing energy consumption in a digital camera, the method including the steps of providing an imager operating in accumulation mode; and substantially continuous flushing of charges from the imager before capturing an exposure of an image with a time between vertical transfers greater than or equal to time between vertical transfers during normal image readout so that, if continuous flushing for a time necessary to readout substantially all rows of pixels has occurred, the exposure may be captured with substantially zero latency.

10 Claims, 3 Drawing Sheets

METHOD FOR REDUCING SHUTTER LATENCY WHILE MAINTAINING LOW DARK CURRENT IN AN IMAGER AND MINIMIZING ENERGY CONSUMPTION

CROSS-REFERENCE TO RELATED APPLICATIONS

Reference is made to and priority claimed from U.S. Provisional Application Ser. No. 60/347,551, filed Jan. 11, 2002, entitled SLOW FLUSH CLOCKING.

The present application is also related to U.S. application Ser. No. 10/268,362, filed Oct. 10, 2002, by John P. Shepherd et al., and entitled, "A CCD HAVING IMPROVED FLUSHING BY REDUCING POWER CONSUMPTION AND CREATING A UNIFORM DARK FIELD WHILE MAINTAINING LOW DARK CURRENT," in which reference is made to and priority claimed from U.S. Provisional Application Ser. No. U.S. 60/347,524, filed Jan. 11, 2002, entitled "SLOW FLUSH CLOCKING."

FIELD OF THE INVENTION

The invention relates generally to the field of image sensors and, more particularly, to such image sensors having continuous flushing of the sensor with a vertical transfer clocking time equal to or greater than its normal operating vertical transfer time.

BACKGROUND OF THE INVENTION

Typically, a true two phase CCD (charge-coupled device) refers to a device in which there are two physical gates over each pixel, with each gate formed in the silicon under it. In this regard, and referring to FIG. 1, there are two-phase voltage lines V1 and V2. This charge-coupling concept is used in frame transfer and interline transfer CCD image sensing.

As is well known in the art, a CCD 1 includes a plurality of pixels 5 for capturing the incident light and converting it into electronic representation. A horizontal shift register 10 receives the charge passed vertically down from the pixels 5, and the shift register 10 eventually passes them out from the CCD 1 for further processing. When initiating image capture, the CCD 1 should be flushed to eliminate undesirable excess charge accumulated during idle periods. In prior art devices, the vertical clocking of the gates during flushing is such that there is a 50% duty cycle in which each clock spends an equal amount of time, $t_p$, at the high and low gate voltage. In addition, the rising edge of V1 is coincident with the falling edge of V2 and vice versa. This provides the condition in which at no time are V1 and V2 at the low gate voltages at the same time until the end of flushing. For clarity of understanding, the vertical clocks (not shown) operate continuously for passing the charge via the horizontal shift register 10 from the CCD 1.

For thoroughness of understanding and as understood by those skilled in the art, the CCD 1 may then capture an image during its integration time which is subsequently readout during image readout. The clocking for these cycles are not shown in their entirety, as they are well known in the art, and few exemplary times are shown for clarity of understanding.

Referring to FIG. 2, there is shown a prior art CCD 1 illustrating its dark field. As illustrated therein, such prior art devices include a non-uniform dark field 15 such that the outer or peripheral portions have a higher dark field than the central or inner potion.

Although the presently known CCDs are satisfactory, they include drawbacks. Such prior art devices have high power consumption and require a relatively long latency period before a picture can be captured after pressing the image capture button. This is commonly referred to in the art as picture-taking latency. Further, the prior art CCDs produce non-uniform dark fields which will, in turn, create a non-uniform background for which correction is required.

SUMMARY OF THE INVENTION

The present invention is directed to overcoming one or more of the problems set forth above. Briefly summarized, according to one aspect of the present invention, the invention relates to a method for reducing shutter latency while maintaining low dark current in the imager and minimizing energy consumption in a digital camera, the method including the steps of (a) providing an imager operating in accumulation mode; and (b) continuous flushing of charges from the imager before capturing an exposure of an image with a time between vertical transfers greater than or equal to time between vertical transfers during normal image readout so that, if continuous flushing for a time necessary to readout all rows of pixels has occurred, the exposure may be captured with substantially zero latency.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of minimizing power consumption by having a continuous slow flush implemented via modified vertical clocking while reducing the picture-taking latency.

BRIEF DESCRIPTION OF THE DRAWINGS

FIG. 3b is alternative timing diagram for the sensor of FIG. 3a; and

DETAILED DESCRIPTION OF THE INVENTION

Figure 1:
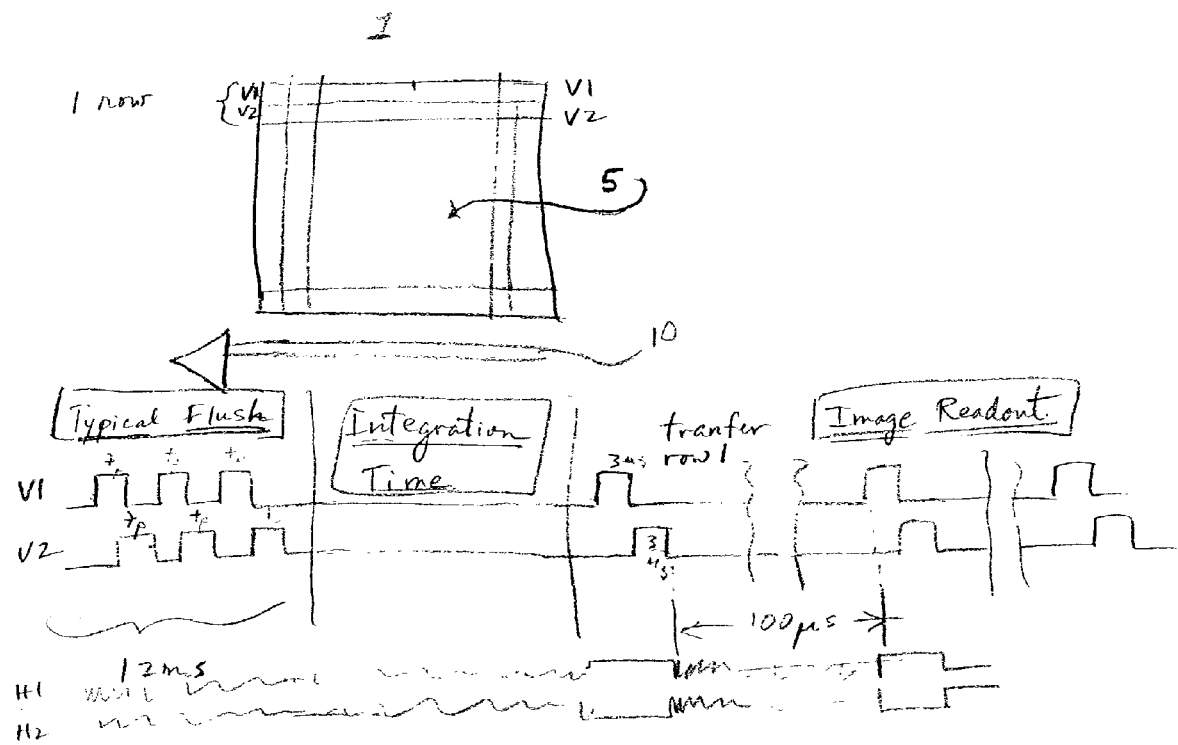
FIG. 1 is a drawing of a prior art image sensor and its typical associated timing diagram.
Figure 2:
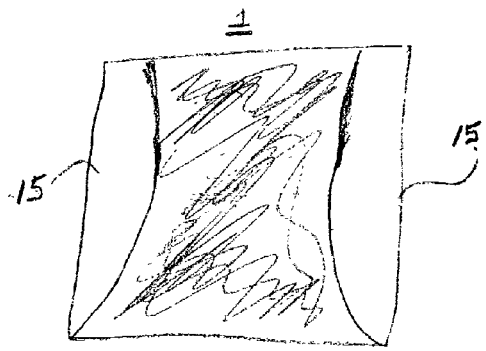
FIG. 2 is an illustration of the non-uniform dark current of a prior art image sensor.
Figure 3A:
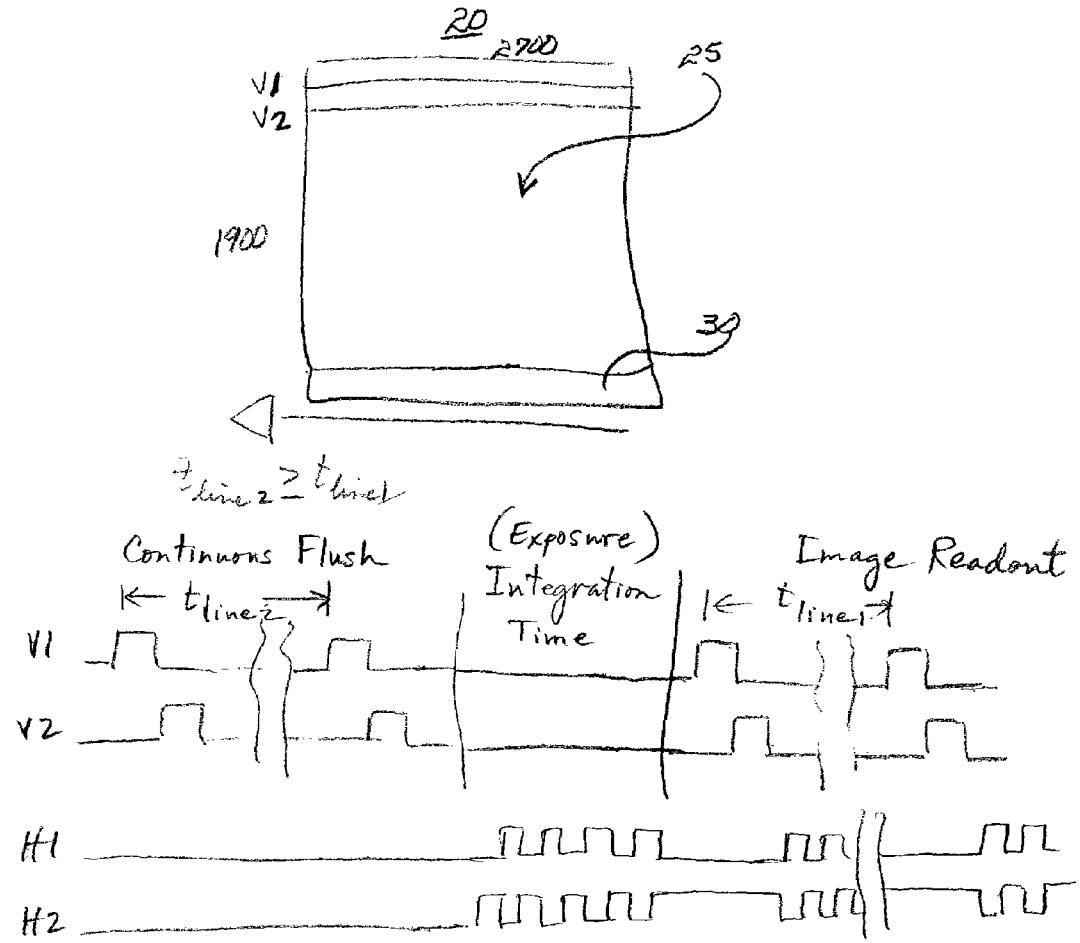
FIG. 3a is a drawing of an image sensor of the present invention and its associated timing diagram.

Referring to FIG. 3a, there is shown a two-phase CCD 20 having a plurality of pixels 25 of the present invention with its associated clocking scheme. The pixels 25 are arranged in an array of rows and columns, 4096×4096 in the preferred embodiment for illustrating an exemplary embodiment, although other configurations are obviously also suitable. It is instructive to note that, although a two-phase device is shown, there may be more than two phases as long as the device can be operated in accumulation mode clocking.

Accumulation mode is disclosed in U.S. Pat. No. 5,115,458, by Burkey et al., titled "Reducing Dark Current In Charge Coupled Devices," and in "Solid State Imaging with Charge-Coupled Devices," by Albert J. P. Theuwissen and will not be discussed in detail herein.

In regard to the operation of the present invention during flushing, the vertical clocking includes clocking V1 high for a predetermined time, preferably the minimum time necessary for good vertical transfer efficiency, and V2 is clocked high on the falling edge of V1 for a predetermined time, also preferably the minimum time necessary for good vertical transfer efficiency. The time the clocks V1 and V2 are low ranges from equal to or twice the normal operating readout duration for reducing power consumption while retaining minimum dark current. For example, in an Eastman Kodak Company KAF-16801CE sensor, the clocks are preferably clocked high for 10 microseconds. Those skilled in the art will readily recognize that different lengths of time that the clock voltages are high will vary according to the specific image sensor. The time the clocks are high is substantially proportional to a square of a width of the CCD.

The horizontal shift register 30 receives the charges passed as a result of the above clocking and subsequently passes them therefrom for further processing. It is instructive to note that the horizontal clock voltages H1 and H2 are continuously low during flush for further conserving energy. In this case, the horizontal shift register 30 functions as a drain to continuously drain charge therefrom (as indicated by the arrow) as they are continuously dumped into the shift register 30. The horizontal flushing clock voltages H1 and H2 are permitted to go active and start flushing the horizontal register immediately before and during the capture of the image.

For thoroughness of understanding and as understood by those skilled in the art, the CCD 20 may then capture an image during its integration or exposure time which is subsequently readout during image readout. The clocking for these cycles are not shown in their entirety, as they are well known in the art.

Figure 3B:
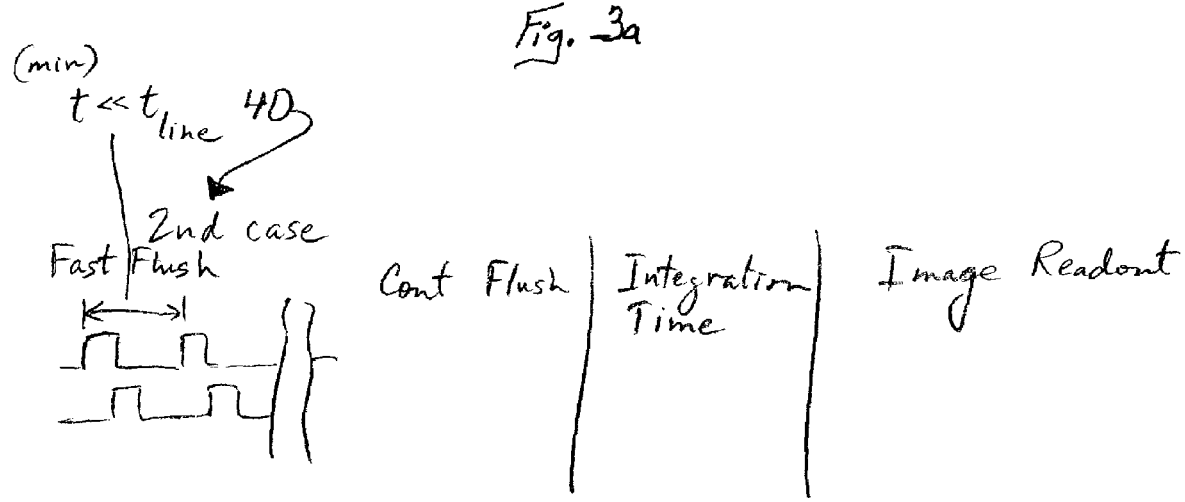

Referring to FIG. 3b, there is shown an alternative embodiment in which fast flushing 40 (the time between which vertical transfers is minimum) occurs preceding the continuous flush. In this case, the time between vertical transfers is substantially less than the time between vertical transfer during normal image readout.

It facilitates understanding to note that the above-described CCD 20 creates an exposure that may be captured with substantially zero latency. In summary, the invention includes a method for reducing shutter latency while maintaining low dark current in the imager and minimizing energy consumption in a digital camera. The method includes providing an imager operating in accumulation mode; and continuous flushing of charges from the imager before capturing an exposure of an image with a time between vertical transfers greater than or equal to time between vertical transfers during normal image readout so that, if continuous flushing for a time necessary to readout all rows of pixels has occurred, the exposure may be captured with substantially zero latency after the shutter button has been pressed because the sensor has been completely flushed.

Figure 4:
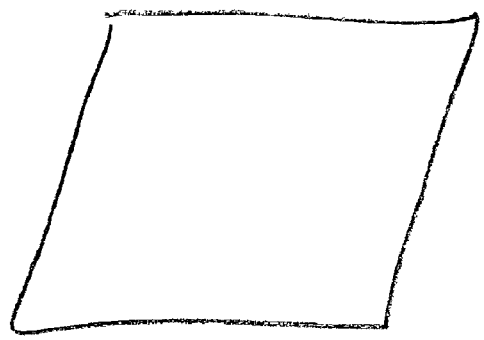
FIG. 4 is an illustration of the uniform dark current of the present invention.

Referring to FIG. 4, there is shown a schematic of the CCD 20 of the present invention illustrating its substantially uniform dark current as illustrated by its uniform density. This is advantageous because this requires little correction of a captured image, and it also has lower noise in the image.

Figure 5:
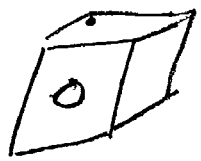
FIG. 5 is a perspective of a digital camera in which the sensor of FIG. 3a may be inserted for implementing the present invention.

Referring to FIG. 5, there is shown a digital camera 50 for implementing the present invention into a commercially usable embodiment. The CCD 20 described hereinabove is placed in the digital camera 50 and functions as the image capture device.

The invention has been described with reference to a preferred embodiment. However, it will be appreciated that variations and modifications can be effected by a person of ordinary skill in the art without departing from the scope of the invention.

| PARTS LIST |
| --- |
| 1 CCD |
| 5 pixels |
| 10 horizontal shift register |
| 15 dark current |
| 20 CCD |
| 25 pixels |
| 30 horizontal shift register |
| 40 flash flushing |
| 50 digital camera |

What is claimed is:

1. A method for reducing shutter latency in an imager operating in accumulation mode, wherein the imager comprises an array of pixels arranged in rows and columns with two or more phases per pixel while maintaining low dark current in the imager and minimizing energy consumption, the method comprising the steps of:
   (a) transferring excess charge from a row of pixels by setting one vertical clocking voltage operatively connected to one phase of the pixels in a row to a high level when another vertical clocking voltage operatively connected to another phase of the pixels in a row is at a low level and shifting the high level to a low level while shifting the low level to a high level;
   (b) setting the vertical clocking voltages to a low level for a time duration selected to be between a minimum time duration that is greater than a time between row transfers during image readout and a maximum time duration of twice the time between row transfers during image readout; and
   (c) repeating steps (a) and (b) for a time necessary to readout all rows of pixels such that an exposure may be captured with substantially zero latency.

2. The method as in claim 1 further comprising horizontal clocking having voltages that are substantially continuously low during the flushing for conserving energy.

3. The method as in claim 2 further comprising providing a horizontal flushing clocking which goes active immediately before capturing an exposure of the image for emptying charge from the horizontal register.

4. The method as in claim 1 further comprising fast flushing, in which the time between transfers of excess charge is minimum and precedes the continuous flushing.

5. A camera for reducing shutter latency while maintaining low dark current in the imager and minimizing energy consumption, the camera comprising:
   (a) an imager operating in accumulation mode, wherein the imager comprises an array of pixels arranged in rows and columns with two or more phases per pixel; and
   (b) two or more vertical clocking voltages each operatively connected to a phase of the pixels in a row and in which one vertical clocking voltage is at a high level when another vertical clocking voltage is at a low level and as the high level is shifted to a low level, the low level is shifted to a high level to transfer a row of excess charge, and after transferring a row of excess charge the two or more vertical clocking voltages are at a low level for a time duration selected to be between a minimum duration that is greater than a time between row transfers during image readout and a maximum duration that is twice the time duration between row transfers during image readout so that, if continuous flushing for a time necessary to readout all rows of pixels has occurred, the exposure may be captured with substantially zero latency.

6. The camera as in claim 5 further comprising horizontal clocking voltages that are substantially continuously low during the flushing for conserving energy.

7. The camera as in claim 6 further comprising horizontal clocking voltages which go active immediately before capturing an exposure of the image for emptying charge from the horizontal register.

8. The camera as in claim 5 further comprising fast flushing, in which the time between transfers of excess charge is minimum and precedes the continuous flushing.

9. The camera as in claim 5 wherein the imager comprises a two phase charge-coupled device imager.

10. The camera as in claim 9 wherein the time the vertical clocking voltages are high is substantially proportional to a square of a width of the two phase charge-coupled device imager.

* * * * *